(12) United States Patent
Ozin et al.

(10) Patent No.: US 6,960,551 B2
(45) Date of Patent: Nov. 1, 2005

(54) FUNCTIONALIZED PERIODIC MESOPOROUS MATERIALS, THEIR SYNTHESIS AND USE

(75) Inventors: Geoffrey A. Ozin, Toronto (CA); Tewodros Asefa, Montreal (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 225 days.

(21) Appl. No.: 10/629,482

(22) Filed: Jul. 29, 2003

(65) Prior Publication Data

US 2004/0072674 A1    Apr. 15, 2004

Related U.S. Application Data

(60) Provisional application No. 60/405,509, filed on Aug. 23, 2002.

(51) Int. Cl.$^7$ ............................................. B01J 29/06
(52) U.S. Cl. .................... 502/168; 502/60; 502/62; 502/150; 502/152; 502/155; 502/216
(58) Field of Search ................. 502/60, 62, 64, 502/150, 152, 155, 168, 216, 232

(56) References Cited

U.S. PATENT DOCUMENTS

| | | | |
|---|---|---|---|
| 4,257,916 A * | 3/1981 | Hancock et al. | 502/60 |
| 5,037,790 A * | 8/1991 | Clerici et al. | 502/162 |
| 5,145,816 A * | 9/1992 | Beck et al. | 502/60 |
| 5,204,076 A * | 4/1993 | Farnos et al. | 423/700 |
| 6,248,686 B1 * | 6/2001 | Inagaki et al. | 502/158 |
| 6,331,500 B1 * | 12/2001 | Tsuji et al. | 502/63 |
| 2005/0070423 A1 * | 3/2005 | Kishan et al. | 502/64 |

* cited by examiner

Primary Examiner—Christina Johnson (57) ABSTRACT

A functionalized porous crystalline material is disclosed exhibiting an X-ray diffraction pattern with at least one peak at a position greater than about 1.8 nm d-spacing with a relative intensity of 100. The crystalline material comprises a framework including metal atoms, oxygen atoms and at least one organic group bonded between at least two of said metal atoms so as to be integral with said framework, and wherein said organic group has at least one sulfonate moiety bonded thereto.

15 Claims, 4 Drawing Sheets

Chemical shift (ppm)

Figure 5

FUNCTIONALIZED PERIODIC MESOPOROUS MATERIALS, THEIR SYNTHESIS AND USE

This application claims the benefit of U.S. Provisional application 60/405,509 filed Aug. 23, 2002.

BACKGROUND OF THE INVENTION

This invention relates to functionalized periodic mesoporous materials and to their synthesis and use.

Porous inorganic solids have found great utility as catalysts and separations media for industrial application. The openness of their microstructure allows molecules access to the relatively large surface areas of these materials that enhance their catalytic and sorptive activity. Until recently, porous materials were generally divided into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (Kirk-Othmer Encyclopedia of Chemical Technology, 3rd Edition, Vol. 20, John Wiley & Sons, New York, p. 766–781, 1982), with the porosity resulting from voids between the particles. Since there is no long range order in these materials, the pores tend be distributed over a rather large range. This lack of order also manifests itself in the X-ray diffraction pattern, which is usually featureless.

Paracrystalline materials, such as certain aluminas, also have a wide distribution of pore sizes, but tend to exhibit better defined X-ray diffraction patterns usually consisting of a few broad peaks. The microstructure of these materials consists of tiny crystalline regions of condensed alumina phases, with the porosity of the materials resulting from irregular voids between these regions (K. Wefers and Chanakya Misra, "Oxides and Hydroxides of Aluminum", Technical Paper No. 19 Revised, Alcoa Research Laboratories, p. 54–59, 1987). Since, there is no long range order controlling the sizes of pores in the material, the variability in pore size is typically quite high. The sizes of pores in these materials fall into a regime called the mesoporous range which, for the purposes of this application, is from about 2 to about 50 nm.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of Periodic Table Group IVB element oxide, e.g. $SiO_4$, and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element is balanced by the inclusion in the crystal of a cation, for example, an alkali metal or an alkaline earth metal cation. This can be expressed wherein the ratio of the Group IIIB element to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 0.2 to less than 2.0 nm, with the largest reported being about 1.3 nm.

Certain layered materials, which contain layers capable of being spaced apart with a swelling agent, may be pillared to provide materials having a large degree of porosity. Examples of such layered materials include clays which may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials. Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

More recently, a new class of porous materials has been discovered, see U.S. Pat. No. 5,102,643, and has been the subject of intensive scientific research. This class of new porous materials, referred to as the M41S materials, may be classified as periodic mesoporous materials and comprise an inorganic porous crystalline phase material having pores with a diameter of 1.5 to 30 nm, which is larger than known zeolite pore diameters. The pore size distribution is generally uniform and the pores are regularly arranged. The pore structure of such mesoporous materials is large enough to absorb large molecules and the pore wall structure can be as thin as about 1 nm. Further, such mesoporous materials are known to have large specific surface areas (about 1000 $M^2/g$) and large pore volumes (about 1 cc/g). For these reasons, such the mesoporous materials enable reactive catalysts, adsorbents composed of a functional organic compound and other molecules to rapidly diffuse into the pores and are therefore, advantageous over zeolites, which have smaller pore sizes. Consequently, such mesoporous materials find potential high-speed catalytic reactions and as large capacity adsorbents.

One problem with existing periodic mesoporous materials is that the relative inactivity of the materials limits their utility in catalytic reactions. Various proposals have therefore been made to enhance their activity by functionalizing the materials.

For example, U.S. Pat. No. 5,145,816 discloses functionalization of periodic mesoporous materials by post-synthesis treatment with a composition comprising M'X'Y'n wherein M' is selected from Periodic Table Groups IIA, IIIA, IVA, VA, VIA, VIIIA, IB, IIB, IIIB, IVB, VB and VIB; X' is selected from halides, hydrides, alkoxides of 1 to about 6 carbon atoms, alkyl of $C_{1-18}$, alkenyl of $C_{1-18}$, aryl of $C_{1-18}$, aryloxide of $C_{1-18}$, sulfonates, nitrates and acetates; Y' is selected from a group consisting of X', amines, phosphines, sulfides, carbonyls and cyanos; and n=1–5. However, post-synthesis functionalization is often accompanied by substantial deceases in pore diameter and pore volume.

PCT Publication No. WO9834723 describes attaching organic groups onto the surface of the inorganic skeleton of periodic mesoporous materials, namely onto the inner surface of the pores, so as to impart selective adsorption ability and specific catalyst functions to the mesoporous substance. Such mesoporous materials are formed with organic groups bound as side chains suspended from the surface of the inorganic base skeleton. Consequently, the pore wall is basically composed of an inorganic skeleton with the organic groups projecting from the surface of the pore wall to form a layer composed of the organic groups.

In such a structure, the surface characteristics of the porous material are determined by the characteristics of the organic groups. As a result, such porous materials are restricted to adsorbing substances to which the organic groups have affinities. Further, the catalytic function or adsorption function derived from the inorganic skeleton can be masked, because the catalytically active sites or adsorption sites in the inorganic skeleton are covered by the organic groups. In addition, the thickness of the pore wall also may increase corresponding to the introduction of the organic group, thereby resulting in substantial decreases in pore diameter and pore volume of the molecular sieve. Further, such organic groups may release under high temperatures or in a catalytic reaction and adsorption process, thus leading to the loss of desirable surface properties and the contamination of the treated material by the released organic group.

In an attempt to alleviate the shortcomings of surface attachment of organic groups, U.S. Pat. No. 6,248,686, which is incorporated herein by reference, teaches incorporating an organic group into the skeleton of a mesoporous material. More specifically, the patent teaches incorporation of an organic group into the mesoporous skeleton such that the organic group is bound to at least two metal atoms in the skeleton. It is reported that the inclusion of the organic group into the skeleton of the mesoporous material confers the properties of the organic group on the mesoporous material without substantially reducing its pore diameter or pore volume. Among the organic groups disclosed in the '686 patent are alkylene groups, alkenylene groups, vinylene groups, alkynylene groups, phenylene groups, hydrocarbons containing phenylene groups, amido groups, amino groups, imino groups, mercapto groups, sulfone ($=SO_2$) groups, carboxyl groups, ether groups and acyl groups.

According to the present invention, a new class of solid acid periodic mesoporous materials have been discovered in which the materials have bridging organic groups containing sulfonic acid moities incorporated into the framework. The resulting sulfonic acid functionalized mesoporous materials have rigid, accessible, reactive and uniformly distributed acid groups and exhibit chemical and physical properties suggesting potential utility in heterogeneous catalysis.

SUMMARY

In one aspect, the present invention resides in a functionalized porous crystalline material exhibiting an X-ray diffraction pattern with at least one peak at a position greater than about 1.8 nm d-spacing with a relative intensity of 100, wherein said crystalline material comprises a framework including metal atoms, oxygen atoms and at least one organic group bonded between at least two of said metal atoms so as to be integral with said framework, and wherein said organic group has at least one sulfonate moiety bonded thereto.

Conveniently, said metal atoms are selected from silicon, germanium, tin, boron and mixtures thereof. Typically, the at least two metal atoms are silicon.

Conveniently, the organic group is selected from an alkylene group, alkenylene group, a vinylene group, an alkynylene group, a phenylene group and a hydrocarbon containing a phenylene group. In one practical embodiment, the organic group is an alkylene group having 1 to 6 carbon atoms, with the metal atoms being connected to the same or adjacent carbon atoms.

In a further aspect, the invention resides in a process for producing an functionalized porous crystalline material according to said one aspect of the invention comprising the step of polycondensing an organometallic compound in the presence of a surfactant, wherein the organometallic compound includes an organic group bonded to at least two metal atoms and at least two hydrolysable groups bonded to each of said metal atoms and wherein said organic group has at least one sulfur-containing moiety bonded thereto.

Conveniently, the at least one sulfur-containing moiety is a sulfonate moiety.

Alternatively, the at least one sulfur-containing moiety is a precursor to sulfonate moiety and the process includes the additional step of converting said precursor to a sulfonate moiety.

DESCRIPTION OF THE DRAWINGS

FIGS. 3(a) and (b) are the $^{13}$C CP-MAS NMR spectra of the periodic mesoporous product of Example 4, after and before respectively oxidation with hydrogen peroxide.

FIGS. 4(a) and (b) are the $^{13}$C CP-MAS NMR spectra of the periodic mesoporous product of Example 5, after and before respectively oxidation with hydrogen peroxide.

FIGS. 5(a) and (b) are the $^{13}$C CP-MAS NMR spectra of the periodic mesoporous product of Example 8, after and before respectively oxidation with hydrogen peroxide.

DETAILED DESCRIPTION OF THE PREFERRED EMBODIMENTS

The present invention provides a novel functionalized periodic mesoporous material exhibiting an X-ray diffraction pattern with at least one peak at a position greater than about 1.8 nm d-spacing (4.909 degrees two-theta for Cu K-alpha radiation) with a relative intensity of 100 and having uniformly-sized pores typically having a diameter (maximum perpendicular cross-sectional pore dimension) of about 1.5 nm or greater as measured by physisorption measurements. Typically, the material will have a hexagonal arrangement of such uniformly-sized pores.

The X-ray diffraction data employed herein were collected on a Siemens D5000 diffractometer employing a high power Ni-filtered Cu—$K_\alpha$ radiation with a wavelength of 0.154178 nm operating at 50 kV/35 mA.

The mesoporous material of the present invention comprises a crystalline framework including metal atoms, oxygen atoms and at least one organic group which is bonded between at least two of said metal atoms so as to be integral with the framework and which has at least one sulfonate moiety bonded thereto.

Various metal atoms may be utilized in the crystal framework, such as silicon, germanium, tin, boron and mixtures thereof. Typically, the crystal framework will contain silicon atoms so that, for example, the material may comprise —Si—O— bonds.

The at least one organic group is integrated into framework of the mesoporous material during synthesis so that the framework has a hybrid composition composed of organic and inorganic material. Consequently, the organic group is held within the mesoporous material in a stable manner. Further, because the organic group is integrated into the pore wall instead of being suspended from the surface of the pore wall, the pore diameter and pore volume of the material are not substantially reduced by the incorporation of the organic species.

The organic group comprises a hydrocarbyl moiety to which is bonded a sulfonate moiety. Suitable hydrocarbyl moieties include an alkylene group, an alkenylene group, a vinylene group, an alkynylene group, a phenylene group and a hydrocarbyl group containing a phenylene group. Where the hydrocarbyl moiety is an alkylene group, the group will typically have 1 to 6 carbon atoms, such as 1 to 4 carbon atoms, with the metal atoms being connected to the same carbon atom or to adjacent carbon atoms.

Examples of suitable hydrocarbyl moieties include, but are not limited to, a methylene group (—$CH_2$—), an ethylene group (—$CH_2CH_2$—), a 1,2-butylene group (—CH($C_2H_5$)$CH_2$—), a 2,3-butylene group (—CH($CH_3$)CH ($CH_3$)—) and a phenylene group (—$C_6H_4$—). It will be appreciated that in the mesoporous material of the invention, at least one hydrogen atom in the hydrocarbyl moiety is substituted by a sulfonate moiety (—$SO_3H$) so that, in the case of a methylene moiety, the framework organic group is —CH $SO_3H^-$.

By virtue of being anchored to a rigid and short bridging organic group synthesized into the framework of the mesoporous material, the sulfonate moiety is rigidly secured, accessible, reactive and uniformly distributed in the material. Moreover, the acidic nature of the sulfonate group should render the mesoporous material of the invention useful in heterogeneous acid catalyzed reactions, such as esterification, alcohol dehydration, condensation, alkylation, transalkylation, isomerization, oligomerization, acylation and nitration.

The functionalized periodic mesoporous material of the invention is conveniently synthesized by polycondensation of an organometallic compound in the presence of a surfactant. The organometallic compound includes an organic group bonded to at least two metal atoms and at least two, and preferably three, hydrolysable groups bonded to each of said metal atoms, wherein the organic group has at least one sulfur-containing moiety bonded thereto. Conveniently, the at least one sulfur-containing moiety is a sulfonate moiety. Alternatively, the at least one sulfur-containing moiety is a precursor to sulfonate moiety and the process includes the additional step of converting said precursor to a sulfonate moiety.

Suitable organometallic compounds for use in the synthesis of the mesoporous material of the invention have the formula:

wherein

M is a metal atom;

$R^1$ is a hydrocarbyl group, such as C1–C6 hydrocarbyl group, having at least one sulfur-containing moiety, wherein the metal atoms M are connected to the same or adjacent carbon atoms;

$R^2$ is a hydrolysable group, such as an alkoxy group or a halide;

$R^3$ is a hydrocarbyl group or hydrogen;

m is an integer of at least 2;

n is an integer of 0 or more obtained by subtracting (m+1) from the valency of the metal atom M; and x is an integer of at least 2.

One suitable organometallic compound is bis(triethoxysilyl)methylthiol, in which M is silicon, $R^1$ is a methinethiol group ($\equiv$CSH), $R^2$ is an ethoxy group, m is 3, n is 0 and x is 2. Such an organometallic compound can readily be synthesized from commercially available bis(triethoxysilyl) methane by lithiation followed by (a) reaction with elemental sulfur, or (b) reaction with bromine and then with either KHS.x$H_2O$ or with $H_2S$/KOH. The thiol group can be converted to the desired sulfonate moiety by treatment with hydrogen peroxide either before or after the polycondensation reaction. Alternatively, the bis(triethoxysilyl)methyl lithium obtained by lithiation of bis(triethoxysilyl)methane can be directly converted to the sulfonate analog by reaction with, for example, trimethylamine sulfur trioxide complex.

Another suitable organometallic compound is bis(triethoxysilyl)butylthiol which can readily be synthesized from bis(triethoxysilyl)methane by lithiation followed by reaction with 3-chloro-1-propanethiol.

The surfactant used in the synthesis of the mesoporous material of the invention is a quaternary ammonium or phosphonium ion of the formula $R_1R_2R_3R_4Q^+$ wherein Q is nitrogen or phosphorus and wherein at least one of $R_1$, $R_2$, $R_3$ and $R_4$ is aryl or alkyl group of from about 6 to about 36 carbon atoms, e.g. —$C_6H_{13}$, —$C_{10}H_{21}$, —$C_{16}H_{33}$ and —$C_{18}H_{37}$ or combinations thereof, the remainder of $R_1$, $R_2$, $R_3$ and $R_4$ being selected from hydrogen, alkyl of from 1 to 5 carbon atoms and combinations thereof. Non-limiting examples of these surfactants include cetyltrimethylammonium, cetyltrimethylphosphonium, decyltrimethylammonium octadecyltrimethylammonium, octadecyltrimethylphosphonium, cetylpyridinium, benzyltrimethylammonium, and dimethyldidodecylammonium. The compound from which the above quaternary ammonium or phosphonium ion is derived may be, for example, the hydroxide, halide, or silicate.

The polycondensation reaction is conveniently effected by mixing the organometallic compound and the surfactant in a suitable solvent, such as water, then adding an acid or alkali to the mixture. Preferably, the polycondensation reaction is conducted at a pH of less than 7. The molar ratio of organometallic compound to surfactant in the mixture is suitably between 1:0.12 and 1:0.24 although, for the synthesis of hexagonally ordered materials, the molar ratio of organometallic compound to surfactant is more typically between 1:0.12 and 1:0.18. The mixture is maintained at a temperature of 25 to 80° C., such as 60 to 80° C., with or without stirring, for sufficient time, such as from 12 hours to 7 days, to allow the polycondensation to proceed. The product is then recovered by filtration, then washed and dried. The surfactant can be removed from the mesoporous product by solvent extraction, such as with a methanol/HCl mixture.

The invention will now be more particularly described with reference to the following Examples.

In the Examples, solution phase NMR spectra were taken with a Varian VXR 300 spectrometer using tetramethylsilane as an internal reference. Solid state $^{13}$C CP-MAS NMR spectra were acquired on a Bruker DSX 400 spectrometer using a zirconia rotor containing the samples and spinning at 6.5 KHz and operating at a 3 second recycle delay, 2 microsecond contact time, $\pi$/2 pulse width of 4.5–7.0 $\mu$s and 3000–5000 scans.

EXAMPLE 1

Synthesis of [bis(triethoxysilyl)methyl]lithium salt

A commercially available bis(triethoxysilyl)methane (BTM) was lithiated by the following procedure. To 300 mL of freshly distilled dry tetrahydrofuran (THF) in a 3-neck flask attached to a bubbler was added 3.07 g (9.00 mmol) BTM and the solution was flushed for 5 minutes with nitrogen that had been passed through a drying column packed with $CaCl_2$ and Drierite. The solution was cooled down to −78° C. and then 5.2 mL, 1.7 M (9 mmol) of t-butyllithium was added dropwise over 10 minutes. The solution was stirred for 30 minutes at −78° C. after which a very, faint yellowish solution resulted. Then the temperature of the solution was raised to room temperature (RT) and stirring continued for 30 minutes at RT after which the solution turned colorless.

EXAMPLE 2

Coupling of [bis(triethoxysilyl)methyl]lithium with Sulfur

The carbanion solution produced in Example 1 was cooled to −78° C. and quenched with a tetrahydrofuran (THF, 100 mL) solution of 0.29 g of sulfur (1.13 mmol $S_8$ or 9.04 mmol S atoms) over 10 minutes under nitrogen. Stirring continued at −78° C. for 30 minutes and then at RT for 24 hrs and the color of the solution turned deep yellowish. Then 0.29 g (9.06 mmol) of MeOH (or alternatively 9 mL, 1 M HCl/Ethanol) was added to the solution and stirring continued for 5 minutes. After extraction of the solvent, a brownish solution was obtained. The crude product, lithium bis(triethoxysilyl)methyl sulfide, was characterized by NMR: $^1$H NMR (300 MHz, $CDCl_3$) $\delta$ 1.25 (t, 18 H, $CH_3$), 2.2 (s, 1 H, SH), 3.75 (q, 12 H, $CH_2$) $^{13}$C NMR (75.48 MHz, $CDCl_3$) $\delta$ 18.7 ($CH_3$) 31.2 (CHS), 58.7 ($CH_2O$); EI-MS (m/z) 355 (11%, $M^+$), 310 (4%, [$M^+$ −44 (M–$OCH_2CH_3$)$^+$])

EXAMPLE 3

Synthesis of Sulfonic Acid PMO Under Basic Conditions 60.00 g (3.33 mol) $H_2O$ was mixed with 30.00 g of 30 wt % $NH_4OH$ (0.53 mmol $NH_3$) $NH_4OH$ and 2.00 g (5.48 mmol) cetyltrimethylammonium bromide (CTABr) was added. The solution was stirred for 5 minutes and then an ethanol (4 mL) solution of the crude product from Example 2 (3.50 g) was added. A deep red solution was obtained. 0.5 mL of 30 wt. % $H_2O_2$ was added to the solution after 5 minutes and the solution turned to orange red color after about 20 minutes. After aging at 80° C. for 4 days, the desired sulfonic acid periodic mesoporous organosilica (SAPMO) product was obtained.

The CTABr surfactant was extracted from the product using solvent extraction in an HCl/methanol solution. 0.5 gm of the as-synthesized SAPMO powder was stirred for 6 hr at 55° C. in a solution of 5 g (36 wt %) HCl/170 g methanol. The product was then isolated on a Buchner funnel, washed with methanol and dried in air.

Figure 1:
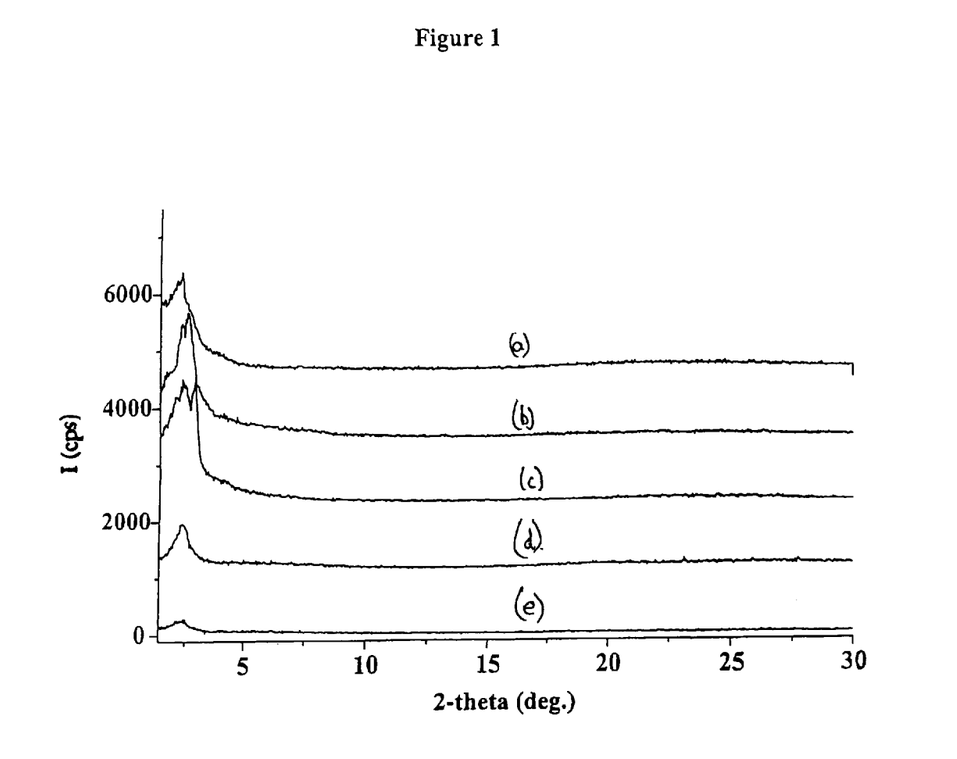
FIGS. 1(a) to (e) are X-ray diffraction patterns of the functionalized periodic mesoporous products of Examples 3, 4, 5, 8 and 10 respectively.
Figure 2:
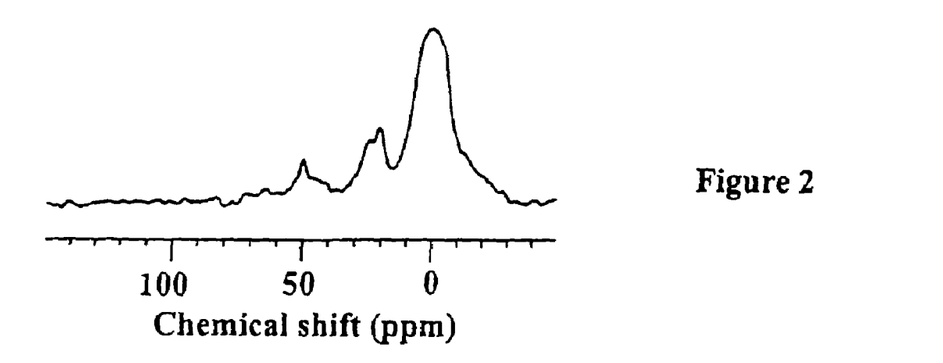
FIG. 2 is the 13C CP-MAS NMR spectrum of the functionalized periodic mesoporous product of Example 3.

The solvent-extracted product was characterized by X-ray diffraction and $^{13}$C CP-MAS NMR spectroscopy and the results are shown in FIGS. 1(a) and 2 respectively.

With regard to FIG. 1(a), it will be seen that the X-ray diffraction pattern shows one peak at a low 2-theta value indicating the presence of an ordered mesoporous structure in the product.

With regard to FIG. 2, the major peaks in the $^{13}$C CP-MAS NMR spectrum at chemical shifts of about 2 and 22 ppm correspond to the $(O_3Si)_2CH_2$ and $(O_3Si)_2CHSO_3H$ carbons respectively. The former is likely a result of either unreacted methylene carbons in the residue precursor used to synthesize the SAPMO or due to some cleavage of the organosulphonic acid group during self-assembly or oxidation of the thiol PMOs. The peak at about 50 ppm observed in the spectrum is probably due to some adsorbed $OCH_3$ carbons from methanol used for washing.

The peak corresponding to the organosulphonic carbons at 22 ppm remained intact even after titration with a base, NaOH, with only a slight shift due to the formation of the sodium salt of the sulphonate ($≡CHSO_3^-Na^+$) indicating that the organosulphonic acid groups in the product were stable to mild basic solutions. After subsequent hydrolysis and regeneration of the acid sites, the peaks corresponding to the organosulphonic acid groups were observed.

EXAMPLE 4

Synthesis of Sulfonic Acid PMO Under Acidic Conditions 13.4 g (0.75 mol) $H_2O$ was mixed with 7.17 g HCl (36.5 wt. %, 71.7 mmol), stirred for 1 minute and 0.34 g (0.93 mmol) CTABr was added into the solution and stirring continued for 30 minutes. Then an ethanol (4 mL) solution of the crude product from Example 2 (1.75 g) was added into the surfactant solution at RT. Stirring was continued for 30 minutes and then the solution was aged at 80° C. for 2 days. After the precipitate was recovered, it was washed with large quantity of water and the surfactant was extracted in HCl/MeOH solution as in Example 3. About 0.3 g of the surfactant-extracted product was taken, mixed with 200 mL water and 15 g $H_2O_2$ (30 wt. %) was added to the solution and the mixture was stirred under nitrogen for 5 hrs. The product was isolated by filtration.

Figure 3:
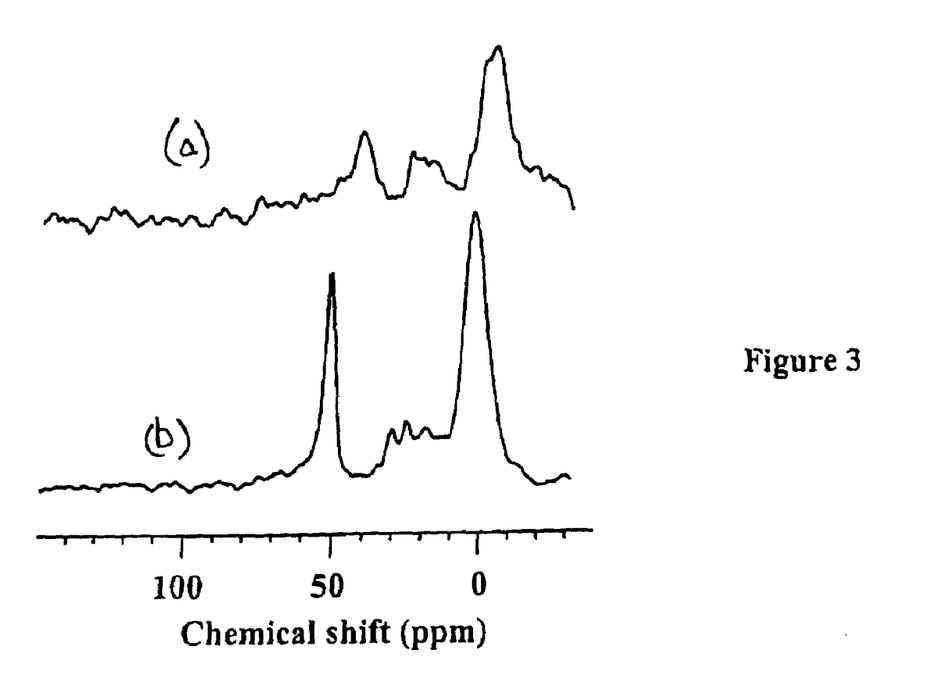

The product was characterized by X-ray diffraction and $^{13}$C CP-MAS NMR spectroscopy and the results are shown in FIGS. 1(b) and 3(a) respectively. FIG. 3(b) shows the $^{13}$C CP-MAS NMR spectrum of the mesoporous material before oxidation with $H_2O_2$. The peak at about 50 ppm observed in the spectrum shown in FIG. 3(b) is probably due to some adsorbed $OCH_3$ carbons from methanol used for washing.

EXAMPLE 5

Synthesis of Sulfonic Acid PMO Under Acidic Conditions

Figure 4:
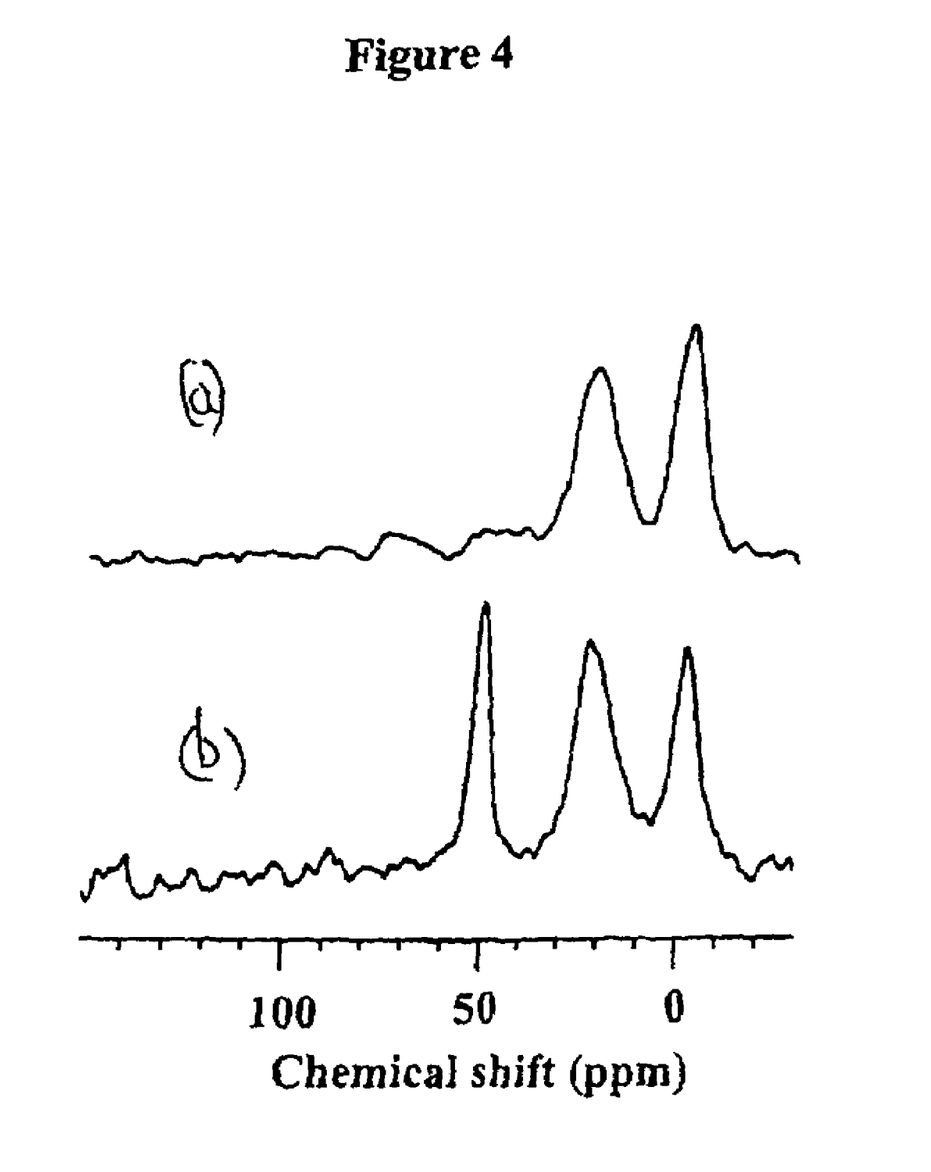

The process of Example 4 was repeated but with the ethanol (4 mL) solution of the product from Example 2 (1.75 g) and 0.44 g of $H_2O_2$ (30 wt. %) being added simultaneously to the surfactant solution at RT. Stirring continued for 30 minutes and the solution was aged at 80° C. for 2 days. The X-ray diffraction the resultant product is shown in FIG. 1(c), whereas the $^{13}$C CP-MAS NMR spectra of the product, after and before oxidation, are shown in FIGS. 4(a) and (b) respectively. It will be seen from FIG. 4 that the product of Example 5 seems to contain a relatively larger amount of sulphonic acid groups as compared with the products of Examples 3 and 4.

EXAMPLE 6

Synthesis of bis(triethoxysilyl)methylbromide

To the lithiated carbanion solution prepared in Example 1 above, a slight excess of bromine (1.5 g, 9.4 mmol) at −78° C. was added. The solution was stirred at −78° C. for 30 minutes and then at RT for 2 hrs. The solvent was pumped off and the product was further extracted with dry pentane. The residue was distilled under vacuum resulting in bis(triethoxysilyl)methylbromide (86% yield): boiling point 144–148° C. at 0.04 mm Hg; $^1$H NMR (300 MHz, CDCl$_3$) δ 0.55–0.58 (t, 1 H, CHSi), δ 1.18–1.23 (q,18H, CH$_3$) δ 2.89–2.92 (d, 2H, CH$_2$Ph), δ 3.78–3.82 (t, 12H, CH$_2$O), δ 7.17–7.20 (d, 2H, ArH), δ 7.36–7.39 (d, 2H, ArH); $^{13}$C NMR (75.48 MHz, CDCl$_3$) δ 10.80 (CHSi), δ 18.46 (CH$_3$), δ 29.47 (CHPh), δ 58.66 (CH$_2$O), δ 130.84, 131.10 (CH aromatic); EI-MS (m/z) 508 (5%, M$^+$), 464 (100%, [M$^+$−44]).

EXAMPLE 7

Coupling of bis(triethoxysilyl)methylbromide with KHS.xH$_2$O solution

A 0.2 g (3.58 mmol) KHS.xH$_2$O solution in anhydrous ethanol was prepared and was dried with MgSO$_4$. After filtration, the solution was added dropwise under stirring into 1.5 g (3.58 mmol) of the bis(triethoxysilyl)methylbromide prepared in Example 6. The solution turned yellowish and some precipitate was observed. After stirring for 5 minutes, the supernatant was isolated and used as a SAPMO precursor.

EXAMPLE 8

Synthesis of Sulfonic Acid PMO Under Acidic Conditions

Figure 5:
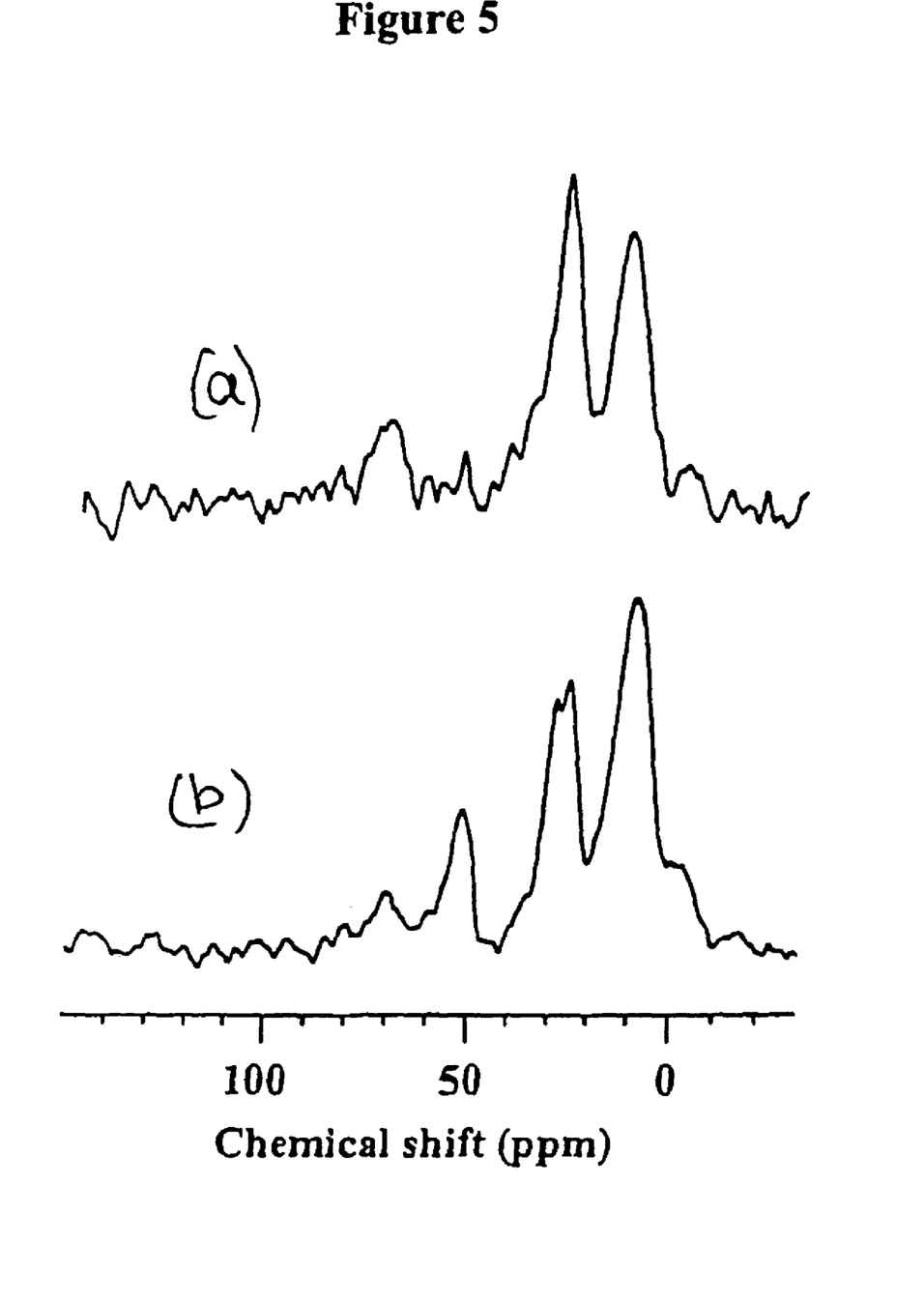

The same surfactant solution used in Example 4 was prepared and the precursor (1.75 g) obtained in Example 7 was immediately added into the surfactant solution and the product was aged at 80° C. for 4 days. The product was treated with 0.5 mL, 30 wt % H$_2$O$_2$ and, after thorough washing, the surfactant was removed as in Example 3. The X-ray diffraction the resultant product is shown in FIG. 1(d), whereas the $^{13}$C CP-MAS NMR spectra of the product, after and before oxidation, are shown in FIGS. 5(a) and (b) respectively.

EXAMPLE 9

Coupling of bis(triethoxysilyl)methylbromide with Solution of H$_2$S/KOH

H$_2$S gas was bubbled into a solution of 0.2 g (3.58 mmol) KOH in 2 mL of anhydrous ethanol. The resultant solution was added dropwise under stirring at RT into 1.5 g (3.58 mmol) of the bis(triethoxysilyl)methylbromide precursor prepared in Example 4. The overall solution was used as a SAPMO precursor immediately after preparation and without being filtered or distilled further to avoid hydrolysis of the alkoxy groups in the presence of KOH base and moisture.

EXAMPLE 10

Synthesis of Sulfonic Acid PMO Under Acidic Conditions

To the surfactant solution prepared in Example 4, 1.75 g of the precursor of Example 9 and 0.44 g $H_2O_2$ were added simultaneously. Stirring continued at RT for 30 minutes and after which the sample was aged at 80° C. for 4 days. The sample was washed thoroughly and the X-ray diffraction pattern of the resulting sample is shown in FIG. 1(e).

EXAMPLE 11

Synthesis of 1,1-Bis(triethoxysilyl)-4-butanethiol

To the carbanion solution of Example 1 cooled down to −78° C. in THF (100 mL), 1.00 g (9.05 mmol) 3-chloro-1-propanethiol was added over 2 minutes. Stirring continued at −78° C. for 30 minutes and then at RT for 24 hrs under nitrogen and the color of the solution turned faint yellowish. Then the solvent was pumped off and the crude was distilled to obtain 1,1-bis(triethoxysilyl)butyl-4-thiol (73% yield), boiling point 72–78° C./0.15 mm Hg; $^1$H NMR (300 MHz, $CDCl_3$) δ 1.21 (t, 18 H, $OCH_2CH_3$), 1.3 0 (s, 1 H, SiCH), 1.80 (s, 1 H, SH), 2.16 (dd, 2 H, $CH_2CH_2CH_2$) 2.81 (t, 2 H, $CHCH_2$), 3.65 (t, 2H, $CH_2SH$), 3.82 (q, 12 H, $OCH_2CH_3$); $^{13}C$ NMR (75.48 MHz, $CDCl_3$) δ −7.89 (CHSi), 18.26 ($OCH_2CH_3$) 31.63 ($CHCH_2$) 35.28 ($CH_2CH_2CH_2$), 43.18 ($CH_2SH$), 58.38 ($OCH_2$); El-MS (mlz) 413 (24.8, M$^+$), 385 (16.6%, [M$^+$−28 (M—$CH_2CH_3$)$^+$]), 355 (19.6%, [M$^+$−58 (M—$OCH_2CH_3$)$^+$]).

The 1,1-bis(triethoxysilyl)-4-butanethiol was used as in the previous Examples to prepare sulfonate functionalized mesoporous materials.

EXAMPLE 12

Coupling of [bis(triethoxysilyl)methyl]lithium with trimethylamine sulphur trioxide complex To the carbanion/THF solution of Example 1 (9.00 mmol), 1.25 g (9.00 mmol) $(CH_3)_3N.SO_3$ solid was directly added at −78° C. Then the solution was heated at 50° C. and its color started turning yellowish and after 3 hrs all the $(CH_3)_3NSO_3$ dissolved. Stirring continued overnight at 50° C. and the color of the solution turned deep red. The solvent was pumped off and a 9.0 mL, 1M HCl/ethanol (9.0 mmol HCl) solution was added while the solution was stirred for 5 minutes. The precipitate, lithium bis(triethoxysilyl)methyl sulfonate, was isolated by filtration and the residue was used as a precursor to prepare SAPMOs.

What is claimed is:

1. A functionalized porous crystalline material exhibiting an X-ray diffraction pattern with at least one peak at a position greater than about 1.8 nm d-spacing with a relative intensity of 100, wherein said crystalline material comprises a framework including metal atoms, oxygen atoms and at least one organic group bonded between at least two of said metal atoms so as to be integral with said framework, and wherein said organic group has at least one sulfonate moiety bonded thereto.

2. The porous crystalline material of claim 1, wherein said metal atoms are selected from silicon, germanium, tin, boron and mixtures thereof.

3. The porous crystalline material of claim 1, wherein said metal atoms are silicon.

4. The porous crystalline material of claim 1, wherein said organic group is selected from an alkylene group, alkenylene group, a vinylene group, an alkynylene group, a phenylene group and a hydrocarbon containing a phenylene group.

5. The porous crystalline material of claim 1, wherein said organic group is an alkylene group having 1 to 6 carbon atoms and said metal atoms are attached to the same carbon atom or to adjacent carbon atoms.

6. A process for producing the inorganic, porous crystalline material of claim 1, comprising the step of polycondensing an organometallic compound in the presence of a surfactant, wherein the organometallic compound includes an organic group bonded to at least two metal atoms and at least two hydrolysable groups bonded to each of said metal atoms and wherein said organic group has at least one sulfur-containing moiety bonded thereto.

7. The process of claim 6 wherein three hydrolysable groups bonded to each of said metal atoms.

8. The process of claim 6 wherein the at least one sulfur-containing moiety is a sulfonate moiety.

9. The process of claim 6 wherein the at least one sulfur-containing moiety is a precursor to a sulfonate moiety and the process includes the additional step of converting said precursor to a sulfonate moiety.

10. The process of claim 6 wherein the organometallic compound has the formula:

wherein

M is a metal atom;

$R^1$ is a hydrocarbyl group having at least one sulfur-containing moiety, with the metal atoms M being connected to the same carbon atom or to adjacent carbon atoms;

$R^2$ is a hydrolysable group, such as an alkoxy group or a halide;

$R^3$ is a hydrocarbyl group or hydrogen;

m is an integer of at least 2;

n is an integer of 0 or more obtained by subtracting (m+1) from the valency of the metal atom M; and x is an integer of at least 2.

11. The process of claim 10 wherein said hydrocarbyl group is a C1–C6 hydrocarbyl group.

12. The process of claim 6 wherein said surfactant has the formula $R_1R_2R_3R_4Q^+$ wherein Q is nitrogen or phosphorus and wherein at least one of $R_1$, $R_2$, $R_3$ and $R_4$ is aryl or alkyl group of from about 6 to about 36 carbon atomsf, the remainder of $R_1$, $R_2$, $R_3$ and $R_4$ being selected from hydrogen, alkyl of from 1 to 5 carbon atoms and combinations thereof.

13. The process of claim 6 wherein said surfactant is selected from cetyltrimethylammonium, cetyltrimethylphosphonium, decyltrimethylammonium octadecyltrimethylammonium, octadecyltrimethylphosphonium, cetylpyridinium, benzyltrimethylammonium and dimethyldidodecylammonium cations.

14. The process of claim 6 wherein the molar ratio of organometallic compound to surfactant is between 1:0.12 and 1:0.24

15. The process of claim 6 wherein the molar ratio of organometallic compound to surfactant is between 1:0.12 and 1:0.18.

* * * * *